(12) United States Patent
Kott et al.

(10) Patent No.: US 7,354,543 B2
(45) Date of Patent: Apr. 8, 2008

(54) MANUFACTURED WOOD PRODUCT PRESS

(75) Inventors: Norbert Kott, Ft. Langley (CA); Steven Rempel, Langley (CA); Orlando C. Janzen, Port Coquitlam (CA); Ayodele Adeleye, Langley (CA); Edmond Tam, Burnaby (CA); James Cheng, Langley (CA)

(73) Assignee: Weyerhaeuser Company, Federal Way, WA (US)

( * ) Notice: Subject to any disclaimer, the term of this patent is extended or adjusted under 35 U.S.C. 154(b) by 71 days.

(21) Appl. No.: 11/236,925

(22) Filed: Sep. 28, 2005

(65) Prior Publication Data

US 2007/0069414 A1 Mar. 29, 2007

(51) Int. Cl.
*B29C 43/06* (2006.01)

(52) U.S. Cl. ............................. 264/171.25; 425/364 R; 425/409; 100/264

(58) Field of Classification Search ................ 425/363, 425/364 R, 409; 100/264; 264/171.25
See application file for complete search history.

(56) References Cited

U.S. PATENT DOCUMENTS 2,107,607 A * 2/1938 Gobel .......................... 26/25
3,850,213 A * 11/1974 Keaton ........................ 100/154
4,335,780 A * 6/1982 Burkhard ..................... 164/441
5,372,062 A * 12/1994 Jonkka et al. ................. 100/37
5,427,723 A * 6/1995 Kugler et al. ............... 264/119

* cited by examiner

Primary Examiner—Robert B. Davis
Assistant Examiner—Marissa W. Chaet
(74) Attorney, Agent, or Firm—Christensen O'Connor Johnson Kindness

(57) ABSTRACT

A press assembly is shown having a plurality of aligned press modules having a lower platen and an oppositely-disposed upper platen, the press modules defining a channel through the press assembly. A resinous wood fiber mat is fed into the channel. The upper and lower platens are driven along synchronized circular paths of travel such that the mat is compressed between the platens and is propelled by the platens through the channel. The platens are connected to eccentric shaft drive assemblies that move the platens along the desired circular path. The action of the eccentric shafts of each module are interconnected and coordinated by gear box units, and the gear box units are interconnected by intermediate gear boxes to synchronize the press assembly. A plurality of motors drives the eccentric shafts, and the supplied power may be distributed by the gear boxes.

17 Claims, 9 Drawing Sheets

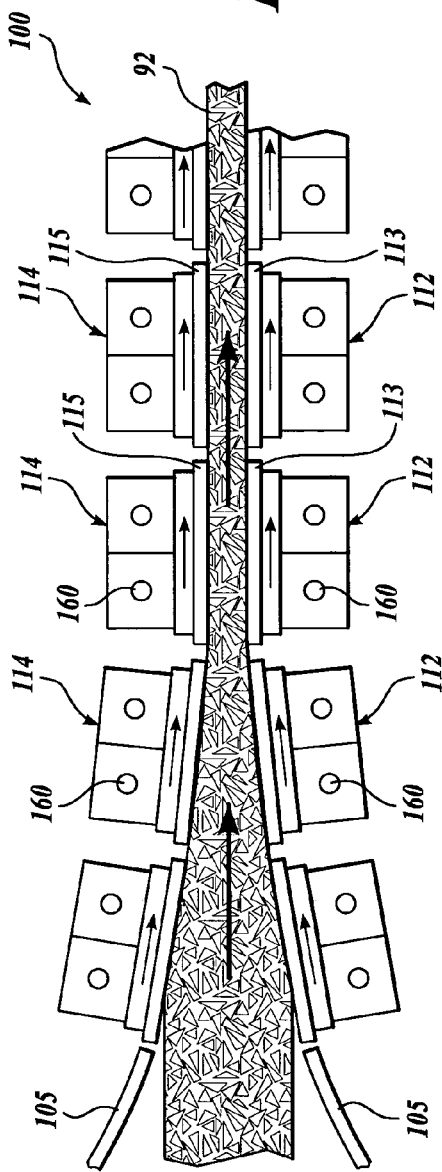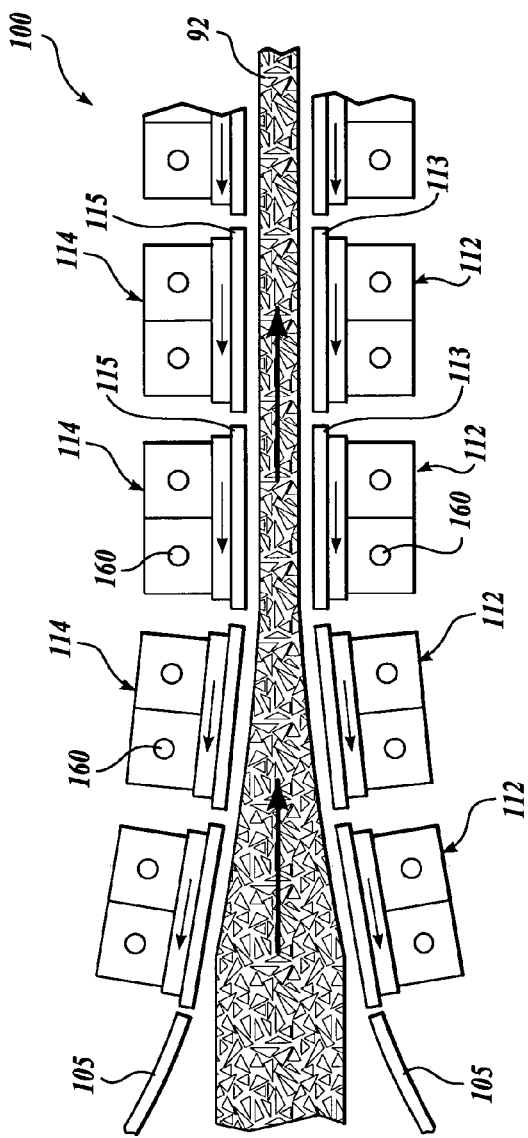

MANUFACTURED WOOD PRODUCT PRESS

FIELD OF THE INVENTION

The present invention relates generally to apparatus for producing wood-based compressed panels and, more particularly, to press assemblies for producing such product.

BACKGROUND OF THE INVENTION

Oriented strand board, parallel strand lumber, flake board, and other wood-based compressed products are produced from wood particles, fibers, chips, and the like, which may be combined with a binder such as a resin or the like. Typically, the wood product and binder are first combined into a continuous low-density, mat-like product that is relatively pliable. The mat is fed into a press where it is compressed under high pressure to produce a relatively dense and rigid board. The mat may be heated during the compression process to promote binding and sometimes to facilitate curing of the resin.

In known continuous presses, such as the apparatus disclosed in U.S. Pat. Nos. 6,142,068 and 6,098,532, a pair of endless steel belts transports a mat between oppositely-disposed flexible intake plates and then over apparently fixed, heated press platens. The flexible plates and platens define a gap having a converging upstream portion wherein the mat is compressed to a finished thickness and a downstream portion wherein the mat is held at the desired size and heated to set the binder. Rollers are provided between the plates/platens and the belt to reduce friction. An array of hydraulic actuators is attached to the flexible plates for setting the shape of the belts and plates. Such systems require pulling the mat through a confined space during compression, which can be difficult and may limit the amount of compression that can be achieved. Moreover, significant heat is typically required to achieve the required heating through the material to fix the resinous binder, which can be difficult and expensive.

In U.S. patent application Ser. No. 10/368,950, Ser. No. 10/368,961, and Ser. No. 10/637,984, invented or co-invented by one of the inventors in the present application, a system and method for forming a compressed composite product using an oscillating compression pressing process is disclosed. All of these applications are herein incorporated by reference.

There remains a need for compression apparatus for efficiently compressing a mat having wood components and a binder.

SUMMARY OF THE INVENTION

A press assembly is disclosed for producing a compressed wood product. The press assembly includes a number of modules having oppositely-disposed upper and lower press units. The upper and lower press units define a channel through which a wood-based mat is disposed. Upper and lower platens are driven in a non-linear path, for example a circular path of travel, to compress the mat. The upper and lower platens are synchronized and move in counter-rotating directions such that the platens also move the mat through the press assembly. An eccentric shaft drive assembly defines the circular path of travel, the eccentric shafts being driven by a motor. A gear box unit coordinates the rotation of the eccentric shaft drive assemblies within each module and intermediate gear box assemblies interconnect the gear box units to coordinate the action of the modules.

In an embodiment of the press assembly, a plurality of press modules is provided. Each press module includes a first drive shaft connected to a lower platen and a second drive shaft connected to an oppositely-disposed upper platen to define a gap therebetween. A drive assembly includes a motor and a drive train that drives the first and second drive shafts. Rotating the first drive shaft moves the lower platen along a circular path of travel and rotating the second drive shaft moves the upper platen along a substantially circular path of travel that is in the opposite direction to the first platen path of travel.

In an embodiment of the invention, the first and second drive shafts include a plurality of concentric sections having an axis of symmetry coaxial with the axis of rotation of the drive shaft and a plurality of eccentric cylindrical sections having an axis of symmetry that is offset from the axis of rotation of the drive shaft.

In an embodiment of the invention, the press modules include one set of bearing assemblies that couple the concentric sections of the drive shafts to the frame and a second set of bearing assemblies that rotationally couple the platen to the eccentric sections of the first drive shaft.

In an embodiment of the invention, the press modules include two eccentric upper drive shafts attached to the upper platen and two eccentric lower drive shafts attached to the lower platen.

In an embodiment of the invention, the drive train includes a number of gear boxes, each gear box coordinating the rotational motion of the drive shafts in press modules.

In an embodiment of the invention, the neighboring gear boxes are interconnected with intermediate gear boxes such that the lower platen of each of the lower press assemblies is synchronized in its circular path of motion.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6A is a sketch of a portion of the press assembly shown in FIG. 1, showing the press modules in the fully extended portion of the cycle compressing a wood fiber mat;

FIG. 6B is a sketch of a portion of the press assembly shown in FIG. 1, showing the press modules in the fully retracted portion of the cycle and releasing from the compressed wood fiber mat;

DETAILED DESCRIPTION OF THE PREFERRED EMBODIMENT

An exemplary press assembly for forming a composite wood product such as strand board according to the present invention will now be described with reference to the figures, wherein like numbers indicate like parts.

Figure 1:
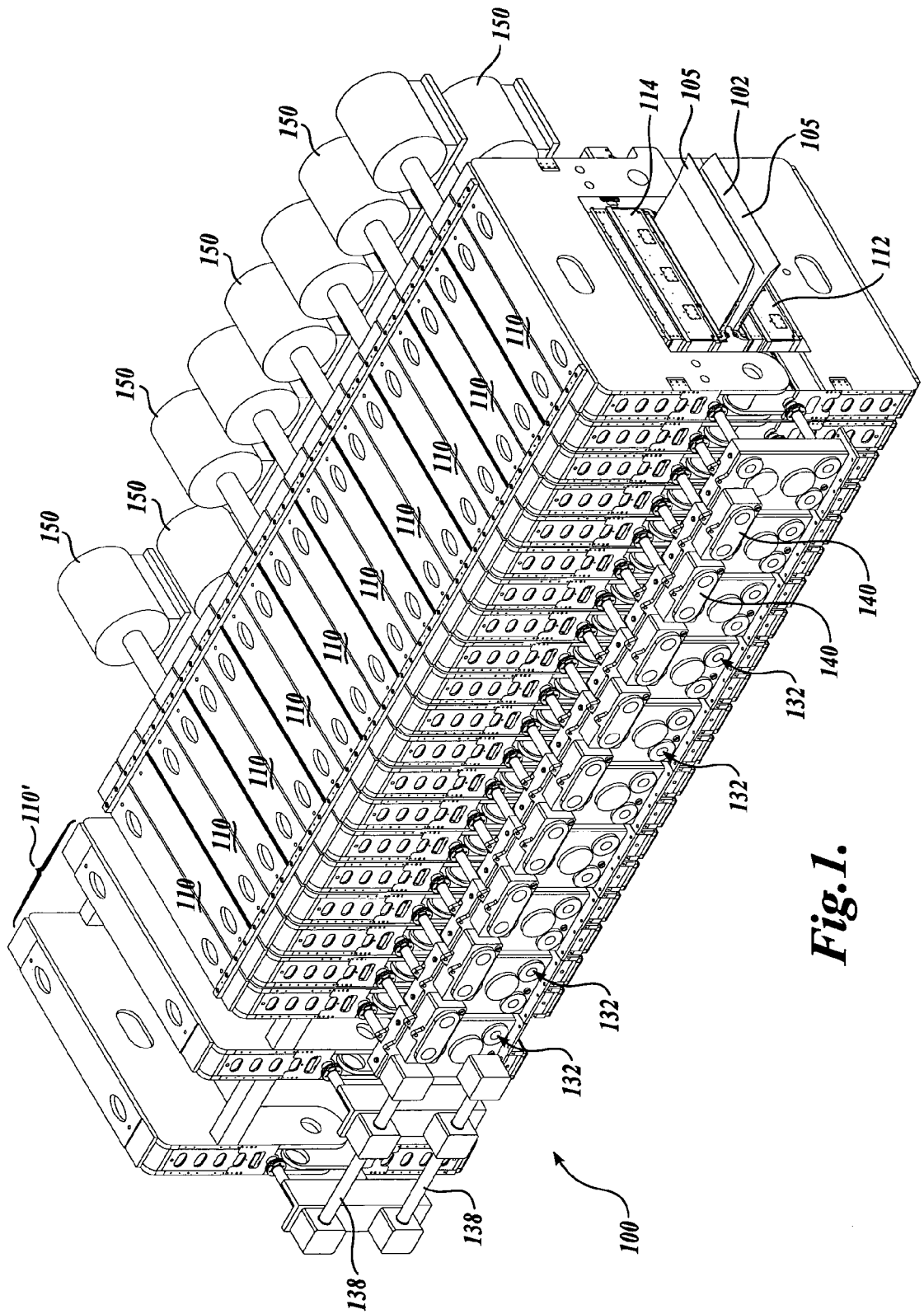
FIG. 1 is an isometric view of a press assembly according to the present invention.
Figure 2:
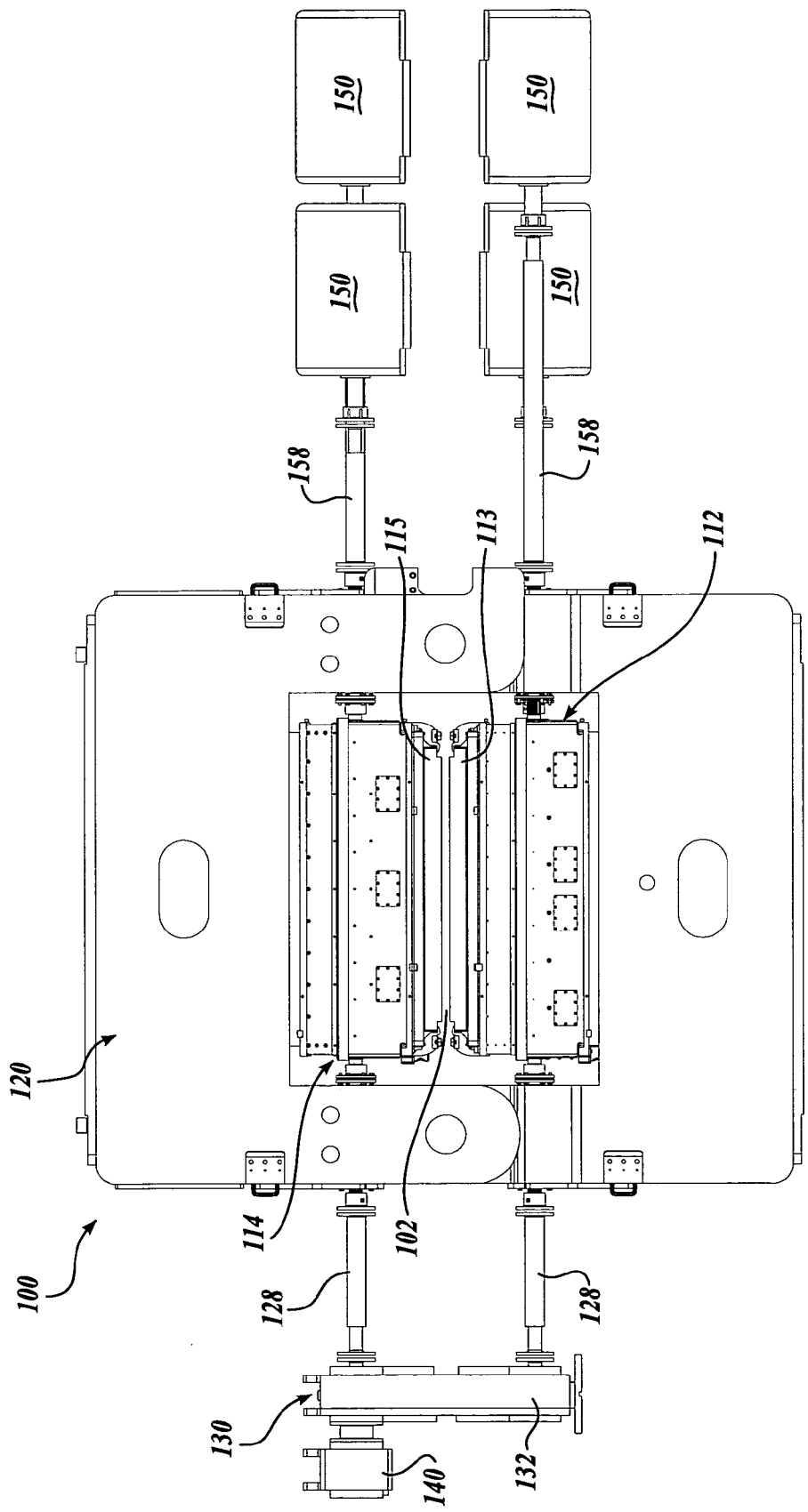
FIG. 2 is a front view of the press assembly shown in FIG. 1.

FIG. 1 shows an isometric view of an exemplary press assembly 100 according to the present invention and FIG. 2 shows a front view of the press assembly 100. The press assembly 100 includes a number of longitudinally-aligned press modules 110 that operate cooperatively to produce a wood-product panel of arbitrary length. The press modules 110 are interconnected with a gear box assembly 130, as discussed below, and are powered with a plurality of motors 150, also discussed below.

The press assembly 100 shown in FIG. 1 includes ten regular press modules 110 and a low-pressure press module 110' nearest the exit end of the press assembly 100. The low-pressure press module 100' is substantially identical to the regular press modules 110, except that the low-pressure press module 110' is spread out to cover a longer length over the distal portion of the press assembly 100 wherein lower pressures are encountered. The press modules 110, 110' cooperatively define a tapering central channel 102 through the press assembly through which a resinous wood-based mat (not shown in FIG. 1), typically including a binder, is fed and compressed to produce the desired compressed wood panel. The binder may be, for example, an alkaline phenolic resin, water-soluble or non-water-soluble alkaline and acidic phenolic resin, resorcinol-formaldehyde resin, urea-formaldehyde resin, isocyanate resin, or the like.

Each of the press modules 110 of the press assembly 100 includes a lower press unit 112 and an opposing upper press unit 114, the lower and upper press units 112, 114 cooperating to compress the mat and to propel the mat through the press assembly 100. In particular, the lower press unit 112 drives a lower platen 113 in a circular path of travel and the upper press unit drives an oppositely-disposed upper platen 115 in a circular path of travel, counter-rotating with respect to the lower platen 113. The motion of the lower platen 113 is synchronized with the motion of the upper platens 115, as described below, such that the lower platen 113 reaches its highest point (i.e., narrowing the channel 102) at substantially the same time the upper platen 115 reaches its lowest point. Similarly, the lower platen 113 reaches its lowest point (i.e., widening the channel 102) at substantially the same time the upper platen 115 reaches its highest point. Therefore, the wood mat disposed between the lower platen 113 and the upper platen 115 is compressed as the opposing lower and upper platens 113, 115 move toward each other. The lower and upper platens 113, 115 are also designed and driven to propel the mat forward through the channel 102. The mat is then released as the platens 113, 115 continue on their circular paths, and move away from the mat.

Figure 3:
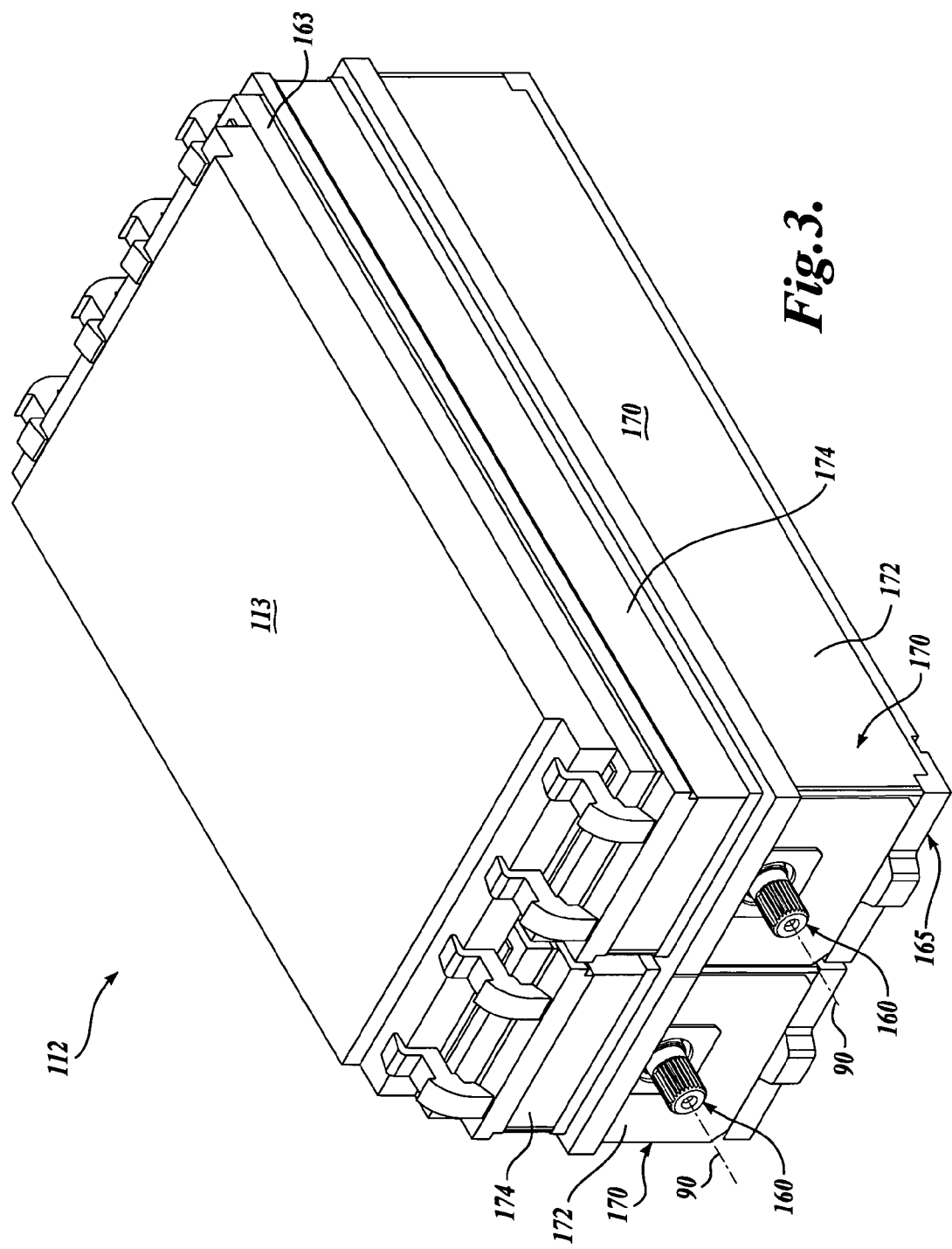
FIG. 3 is a perspective view of a lower press unit for the press assembly shown in FIG. 1.

A typical lower press unit 112 is shown in isolation in FIG. 3. The upper press unit 114 is substantially similar to the lower press unit 112 and, therefore, will not be separately described in detail. The lower press unit 112 includes two eccentric shaft drive assemblies 160 (described below) rotatably disposed in respective oil pans 170. The oil pans 170 include a lower pan portion 172 and a nested upper pan portion 174, such that the motion of the platen 113 may be accommodated.

The lower platen 113 is attached the eccentric shaft drive assemblies 160. The eccentric shaft drive assemblies 160 are synchronously rotated and cooperatively move the lower platen 113 along a circular path of travel, maintaining a constant orientation of the lower platen 113. A support plate 165 is provided at the bottom of the oil pans 170 for attaching the lower press unit 112 to a peripheral frame assembly 120 (FIG. 2).

Although it is not necessary to the present invention, the lower and upper platens 113, 115 may be heated to achieve a desired heat deposition to the mat and/or to preclude or hinder heat loss from the mat. In an embodiment of the invention, the lower and upper platens 113, 115 include a plurality of transverse channels (not shown) through which a heated fluid may be circulated to heat the platens 113, 115.

Figure 4A:
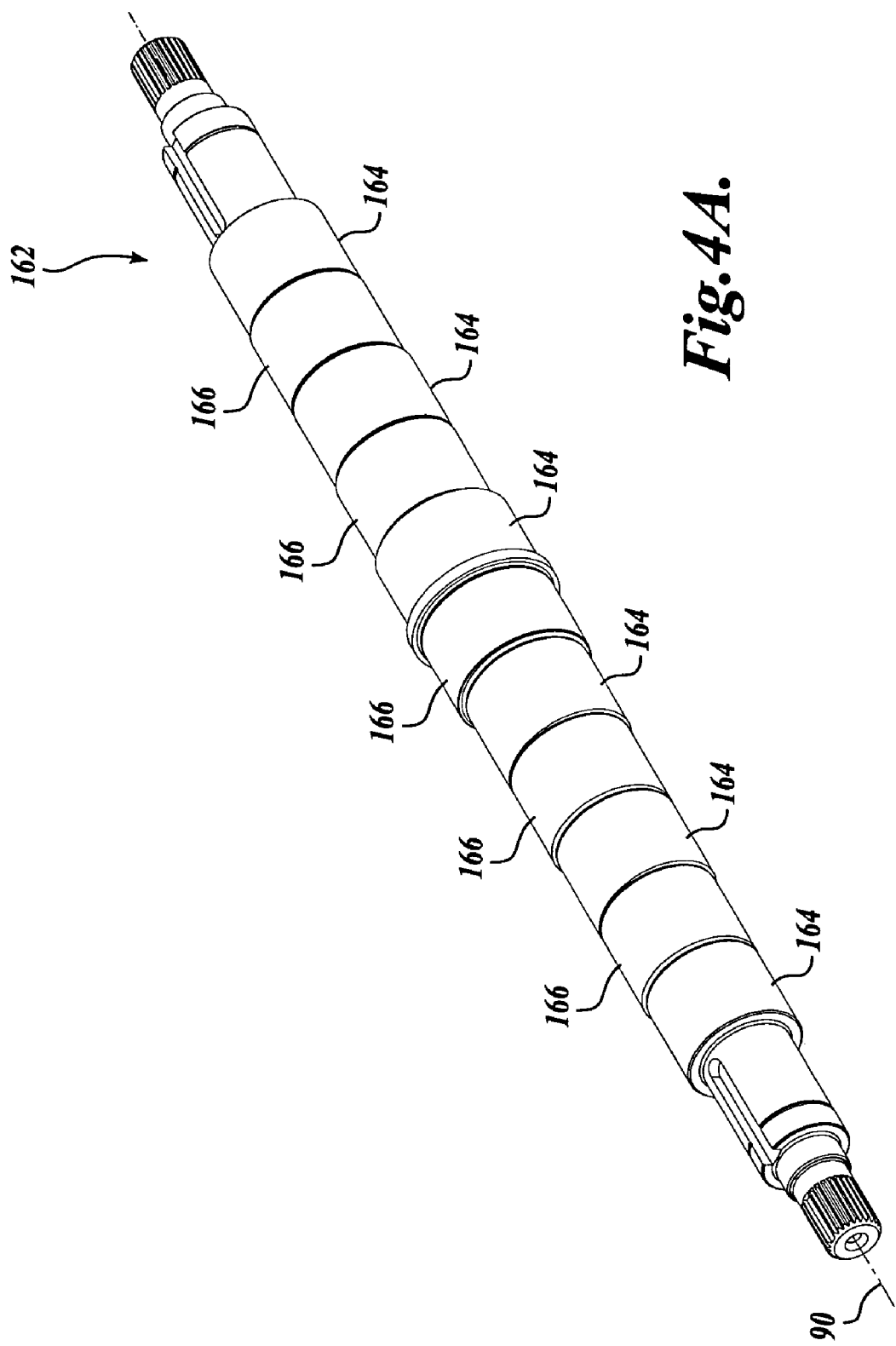
FIG. 4A is a perspective view of an eccentric shaft for the press assembly shown in FIG. 1.

FIG. 4A shows an eccentric shaft 162 for the eccentric shaft drive assemblies 160. The eccentric shaft 162 includes a number of concentric sections 164 (six shown) that alternate with eccentric sections 166 (five shown). The concentric sections 164 are cylindrical sections that are co-axial with the shaft axis of rotation 90. The eccentric sections 166 are cylindrical sections that are offset from the shaft axis of rotation 90. The eccentric sections 166 are disposed about a common offset axis (not shown). It will be appreciated by the artisan that the eccentric shaft 162 is essentially a crankshaft wherein the "crank" portions (i.e., the eccentric sections 166) are offset from the axis of rotation 90 in the same direction. It is also contemplated that more or fewer eccentric sections 166 may be used—including, for example, only one eccentric section 166—without departing from the present invention.

Figure 4B:
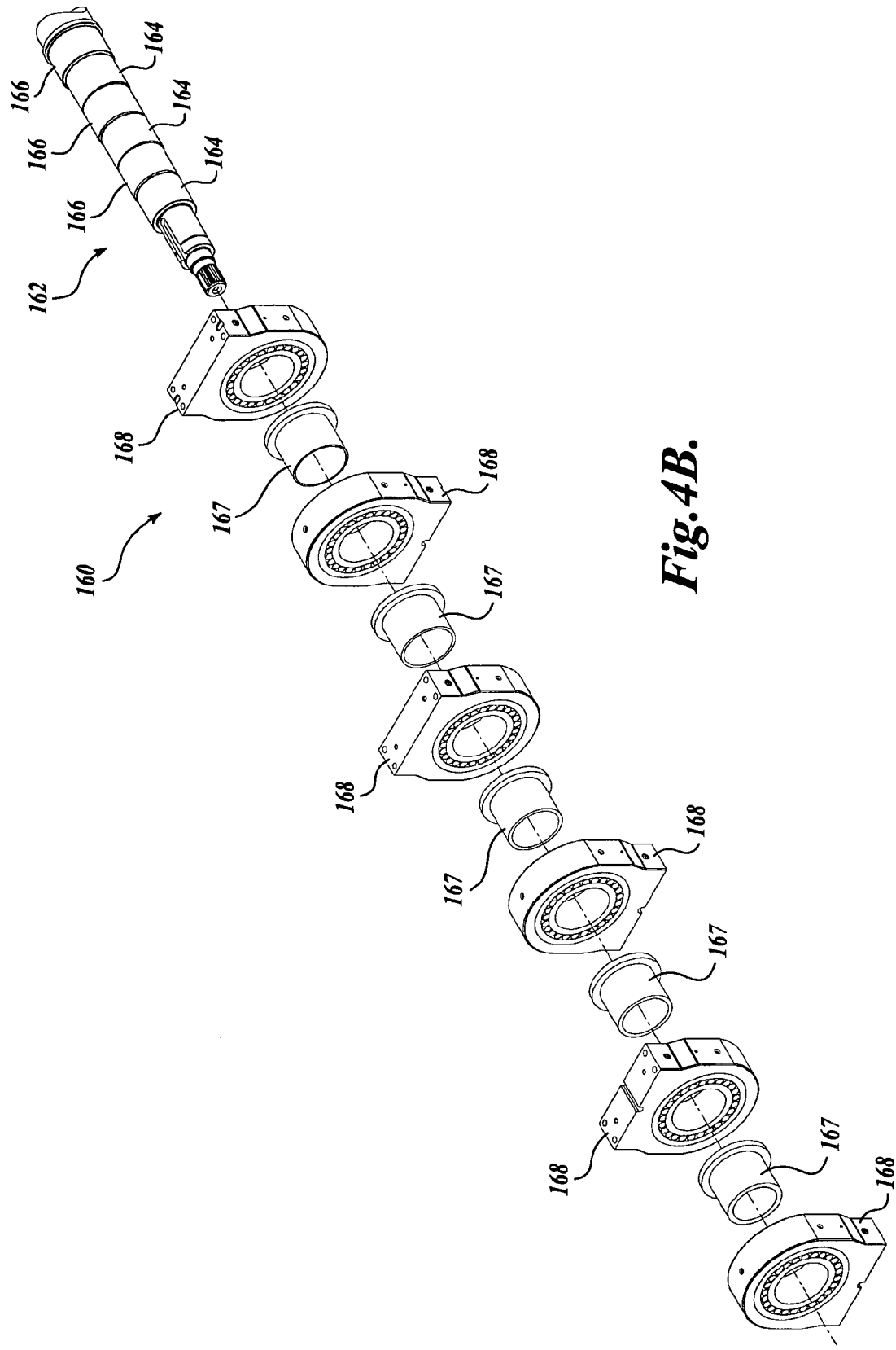
FIG. 4B is an exploded fragmentary view of an eccentric shaft drive assembly for the press assembly shown in FIG. 1.
Figure 4C:
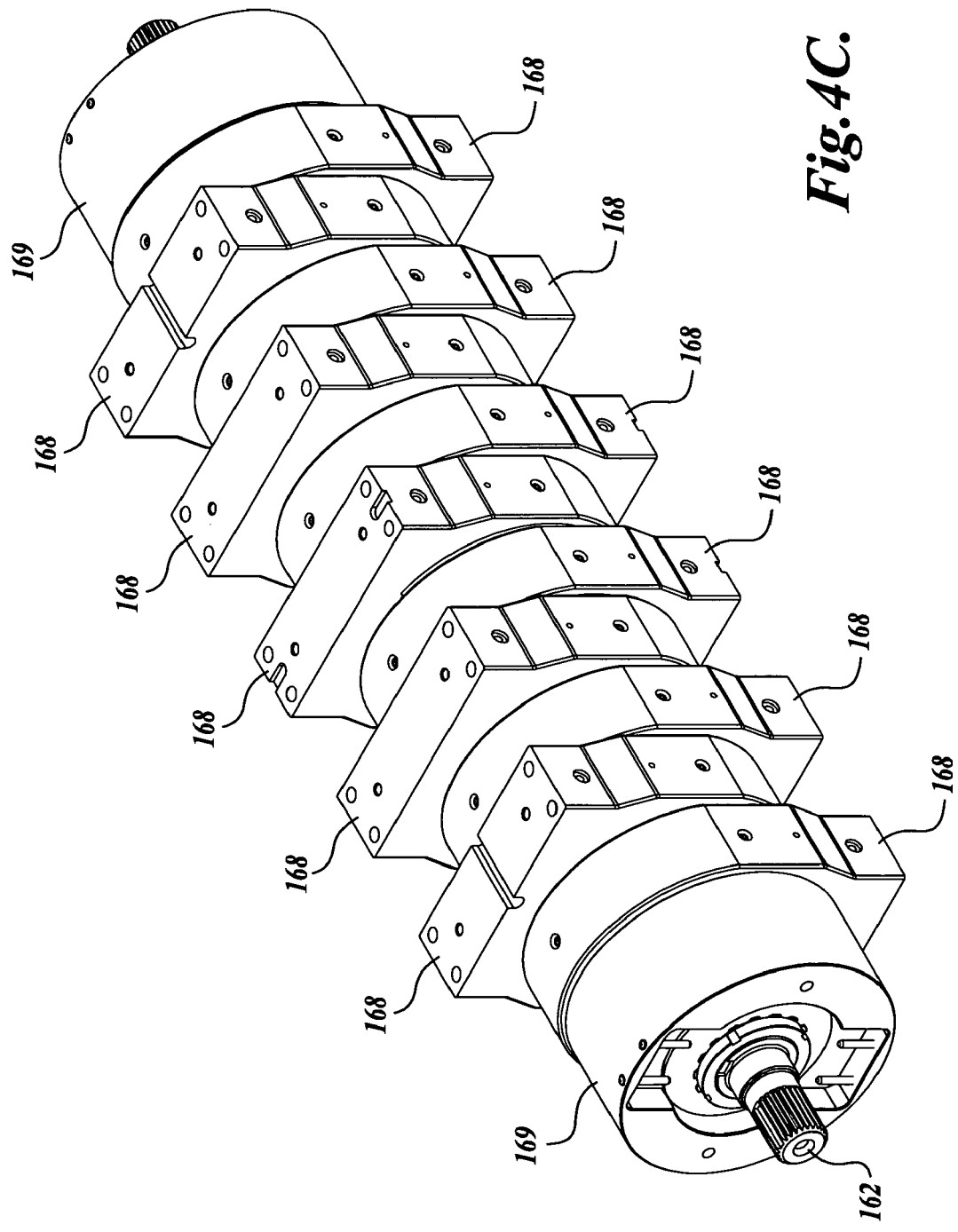
FIG. 4C is a perspective view of an eccentric shaft drive assembly for the press assembly shown in FIG. 1.

FIG. 4B shows an exploded view of one side of the eccentric shaft drive assembly 160 with bearing assemblies 168 and related bushings 167 disposed about each of the sections 164 and 166 of the eccentric shaft 162. An assembled eccentric shaft drive assembly 160 is shown in FIG. 4C. Conventional end support assemblies 169 are also shown in FIG. 4C. For the lower press unit shown in FIG. 3, the bearing assemblies 168 disposed about the concentric sections 164 are attached to the fixed support plate 165 (FIG. 3) and bearing assemblies 168 disposed about the eccentric sections 166 are attached to the lower platen 113 (FIG. 3) through a conversion plate 163. The upper press unit 114 is similarly constructed.

It will now be appreciated that rotating the eccentric shafts 162 about their respective axes of rotation 130 will cause the attached lower platens 113 to move along a circular path of motion while maintaining the orientation of the lower platen 113. As mentioned above, the upper press unit 114 is substantially the same as the lower press unit 112. The upper platen 115 is adapted to move along a counter-rotating circular path of travel.

Referring again to FIGS. 1 and 2, it can be seen that the central channel 102 is substantially defined by the gaps between the lower platens 113 and the upper platens 115. Upper and lower converging in-feed plates 105 are also shown in FIG. 1. The eccentric shafts 162 for the lower press units 112 rotate opposite from the direction of rotation for the eccentric drive shafts 162 for the upper press units 114, so that the lower and upper platens 113, 115 move in counter-rotating directions. The circular motion of the lower and upper platens 113, 115 are preferably closely synchronized so that the lower platens 113 are at a position furthest into the central channel 102 at the same time as the counter-rotating upper platens 115 are at a position furthest into the central channel 102, at that point providing maximum compression to the mat. At that point the lower and upper platens 113, 115 are also both moving forwardly, thereby propelling the mat through the press assembly 100. The lower and upper press units 112, 114 are rigidly supported by a peripheral frame assembly 120.

The gear box assembly 130 is provided to coordinate timing within each of the press modules 110 and to coordinate the timing among the plurality of press modules 110. As seen most clearly in FIGS. 1 and 2, the gear box assembly 130 includes a gear box unit 132 for each press module 110, intermediate gear boxes 140 connecting neighboring gear box units 132, and drive trains 138 that extend to the low-pressure press module 110'. The press modules 110 are attached to the gear box assembly 130 with intermediate drive shafts 128.

Figure 5:
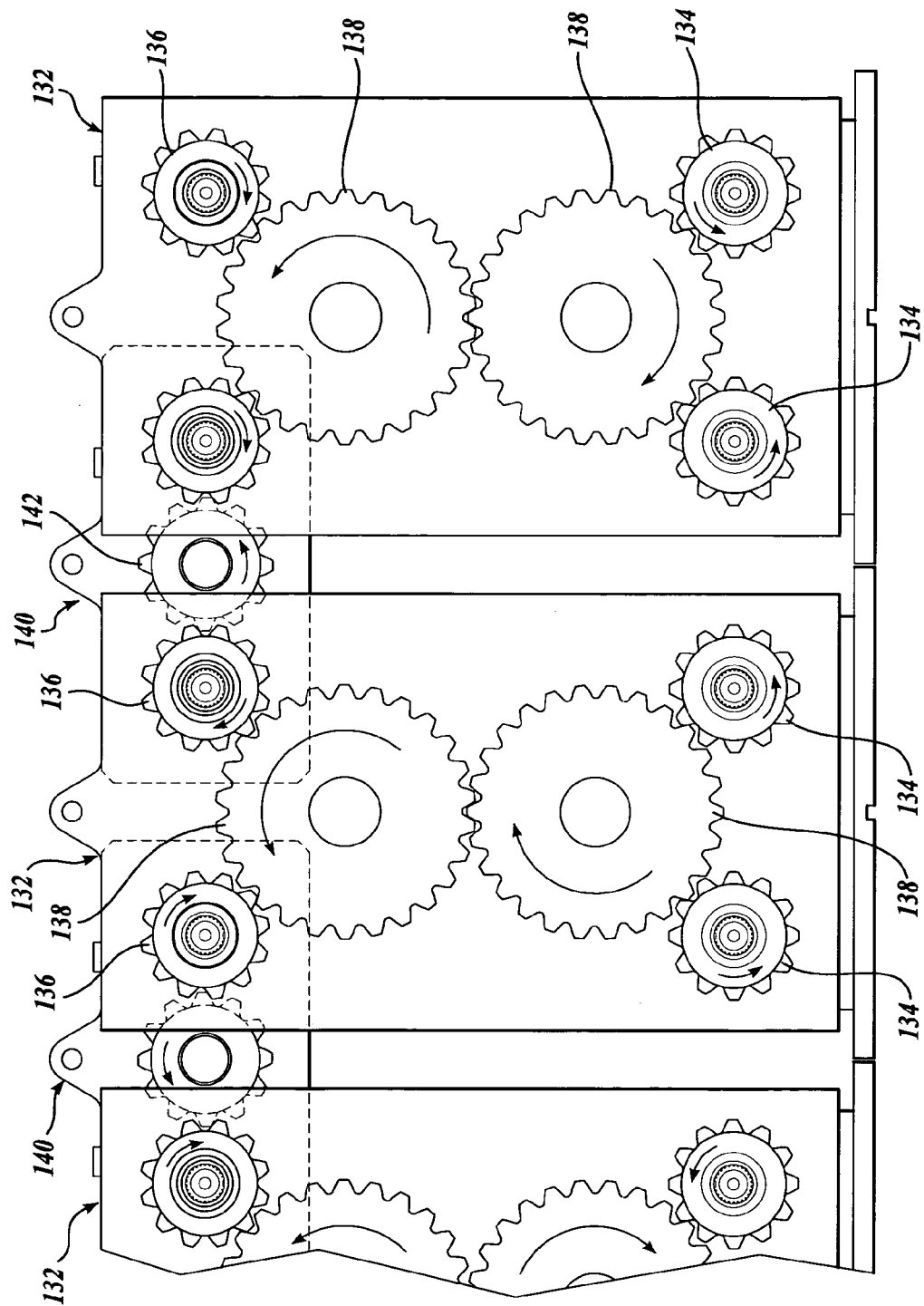
FIG. 5 is a front view of a portion of a gear box assembly for the press assembly shown in FIG. 1.

FIG. 5 shows a front view of two gear box units 132 that are interconnected with intermediate gear boxes 140. The gear box units 132 include two lower driving gears 134 that connect to the lower press unit 112 through intermediate drive shafts 128 (FIG. 2). Two upper driving gears 136 connect to the upper press unit 114 through similar intermediate drive shafts 128. Central connecting gears 138 connect the lower and upper driving gears 134, 136 to coordinate the timing of the lower and upper press units 112, 114 in a press module 110. It will be appreciated, as indicated by the arrows in FIG. 5, that the lower driving gears 134 rotate in the opposite direction as the upper driving gears 136.

The intermediate gear box 140 provides an intermediate gear 142 that connects upper driving gears 136 between two adjacent gear box units 132. It will be appreciated that the gear box assembly 130 provides a straightforward timing mechanism such that the lower press unit 112 in a module can be maintained in a desired coordination with the corresponding upper press unit 114 and the action of all of the press modules 110 can be maintained to operate in a coordinated manner. The gear box assembly 130 also operates to distribute power between the press modules 110 as the press assembly 100 is operating. The two press half-modules 110' are connected to the chain of gear box assemblies 130 with extension drive trains 138.

Referring again to FIGS. 1 and 2, a number of electric motors 150 drivably engage at least some of the press modules 110, providing the motive power for the press assembly 100. The motors 150 may be of any suitable type as are well known in the art and may be alternatively powered, without departing from the present invention. The motors 150 must cumulatively provide sufficient power to achieve the desired press functionality, i.e., to compress the mat and operate the various components of the press assembly 100. It is contemplated that the present invention may be practiced using individual motors for each of the eccentric shaft drive assemblies 160, for example. In the press assembly 100 shown in FIG. 1, there are forty-four eccentric drive shaft assemblies 160, i.e., each press module 110 has four eccentric drive shaft assemblies 160 and the low-pressure press module 110' each has two eccentric drive shaft assemblies 160.

In the currently preferred press assembly 100, twenty motors 150 are used. The specific type, number, and size of motor will obviously depend on the particular application, obvious design and economic constraints, and motor availability. Moreover, the motors 150 do not need to be all of the same power. For simplicity in developing the current press assembly 100, however, the motors 150 are all of the same type and power. Asynchronous motors with natural load-sharing capabilities were chosen. In particular, the selected motors are 100 hp D-type motors.

Referring again to FIG. 2, the motors 150 are connected to the press modules 110 through intermediate drive shafts 158. In particular, in the present assembly 100, each motor 150 engages an intermediate drive shaft 158 that may extend through the peripheral frame assembly 120 either directly or through a short connecting shaft (not shown). The intermediate drive shaft 158 drivably engages an eccentric shaft drive assembly 160 that, in turn, engages the gear box assembly 130 through another intermediate drive shaft 128.

In the preferred application, the motors 150 are connected to the press assembly 100 through selected press modules 110. It will now be appreciated that the gear box assembly 130, in addition to synchronizing the press modules 110 also distributes the power provided by the motors 150 to the press modules 110 and low-pressure press module 100' throughout the press assembly 100.

One design parameter is the selection of which eccentric shaft drive assemblies 160 will be directly connected to the motors 150. In the current embodiment, the selection criteria was based on achieving the lowest maximum torque transmitted between press modules 100 through the gear box assembly 130. An algorithm was developed to estimate the transmitted torque, based on the motor 150 characteristic curves and estimated power requirements for compressing the mat through the press assembly 100:

Step 1: Set shaft rotation speed.
Step 2: Calculate motor torque output using characteristic curve.
Step 3: Initialize with the press fully open and divide one cycle into N rotational intervals.
For each rotational interval:
Step 4: Calculate the acceleration of the press through a rotational interval.
For each half of a module:
Step 5: At each half module calculate the difference between the motor torque and the torque required to compress the mat.
Step 6: Calculate the gear-to-gear torque transmission.
Step 7: Calculate the gear-to-shaft torque transmission.
Step 8: Calculate the motor-to-shaft transmission for each motor set, which includes the rotor of the motor, a drive shaft, and a coupling.
Step 9: Increment to next half module and go to Step 5 until all half modules are complete.
Step 10: Increment rotational interval and go to Step 4 until through complete cycle.

This calculation was performed for all relevant combinations of motor 150 connections to eccentric shaft drive assemblies 160. The optimal configuration selected is the configuration that resulted in the lowest maximum torque transmitted through the gear box assembly 130.

Using this algorithm, an optimal solution was selected wherein most of the motors 150 were placed in the highest pressure zone of the press assembly 100. Clearly, the particular arrangement of motors 150 will be strongly dependent on the particular application. It is also contemplated that other selection criteria may be appropriate in certain applications.

FIG. 6A is a sketch of a portion of the press assembly 100, with all of the support structure omitted to show a wood mat material 92 being fed through the press assembly 100 and being compressively impacted by a plurality of press modules 110. As shown in FIG. 6A, all of the lower press units 112 moving along a synchronized circular path of travel are at the portion of the cycle at their furthest upward position and all of the upper press units 114 are at their furthest downward position such that press modules 110 are forming the narrowest gap for the wood mat material 92. It will be appreciated from the arrows that the upper and lower press units 112, 114 are moving in the direction of the desired path for the wood mat material 92, thereby propelling the wood mat material 92 through the press assembly 100.

FIG. 6B is a similar sketch showing the lower press units 112 at their furthest downward position (wherein the extent of travel is exaggerated, for illustrative purposes) and the upper press units 114 at their furthest upward position. The lower and upper press units 112, 114 separate from that the wood mat material 92, thereby eliminating friction between the press units 112, 114 and the wood mat material 92, such that the wood mat material 92 will move forward through the press assembly 100.

In a currently preferred embodiment of the press assembly 100, the eccentric shaft drive assemblies 160 rotate at about 1,000-1,200 rpm. Therefore, as shown in FIGS. 6A and 6B, the press assembly 100 executes compression strokes on the mat material 92 along the length of the press assembly 100 approximately 20 times per second. The compression stroke cycle produces a maximum applied pressure at the point depicted in FIG. 6A and zero applied pressure at the release portion of the cycle shown in FIG. 6B. Although the pressure applied to the mat material 92 varies as the mat material 92 progresses through the press assembly 100, peak pressures in the mat greater than 600 psi have been measured in test runs of a model system. Preliminary calculations indicate a total power requirement for the disclosed press assembly 100 of about 2,400 hp. It will be appreciated, therefore, that a substantial amount of work is being put into compressing the mat material 92. It has been found that the mat material 92 becomes quite hot from the compressive cycling of the material during operation of the press assembly 100. In one mode of operating the present invention, there is no additional heating required of the mat material 92 because the internal heating due to the cyclic compression and work performed on the mat material 92 are sufficient to achieve the desired mat material 92 temperature. It is contemplated that the mat material 92 may be compressed to a density greater than the original density of the constituent wood product in the mat material 92.

As discussed above, the lower and upper platens 113, 115 may be heated—for example, by circulating a heated oil or other fluid through channels in the platens 113, 115. Heat platens may function, for example, to limit or prevent heat loss from the mat material 92 rather than significantly heating the mat material 92.

As indicated by FIGS. 6A and 6B, it is contemplated that the press assembly 100 may be operated in a continuous mode such that the length of the final product may be arbitrarily selected. The system may include a programmable cutting system for producing boards of a selected length.

Figure 7:
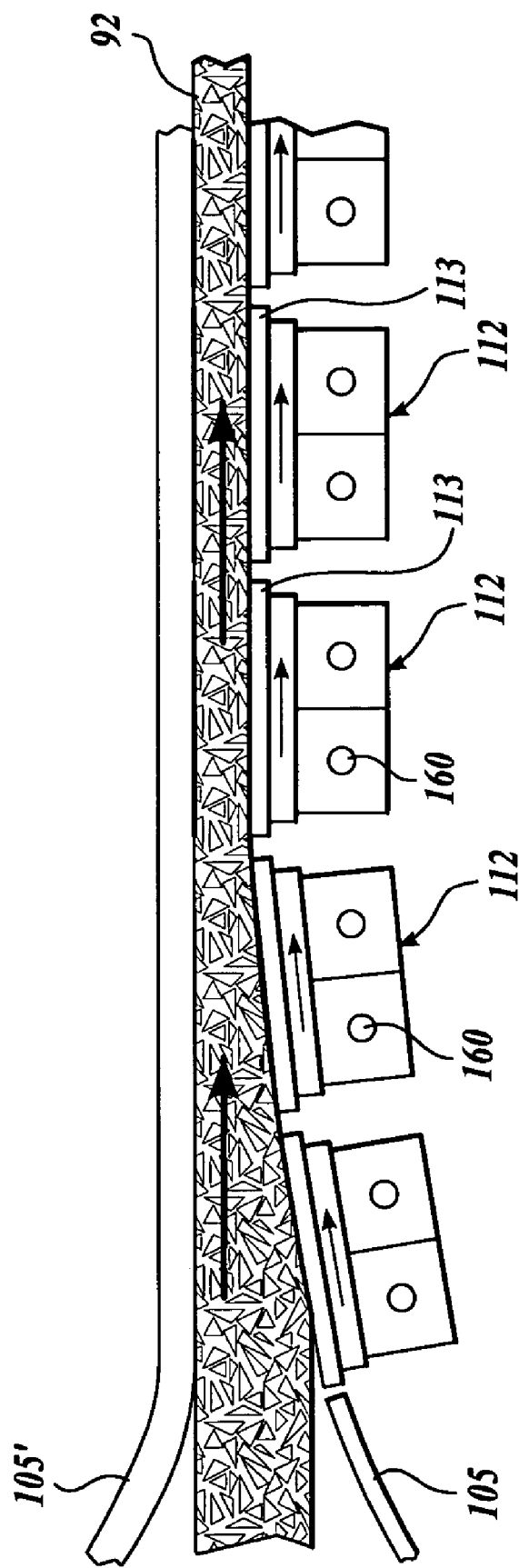
FIG. 7 is a sketch of a portion of an alternative embodiment of the press assembly, similar to FIG. 6A, having a fixed wall rather than upper press units.

Although the preferred embodiment disclosed herein the press modules 110 include oppositely-disposed lower and upper press units 112, 114, the present invention may alternatively be practiced wherein the press modules include a press unit on only one side, upper or lower, and the material 92 is compressed against an opposite wall. FIG. 7 is a sketch similar to FIG. 6A, wherein an alternative press assembly includes only lower press modules 112, with lower platens 113 driven along a circular path of travel, and the upper surface of the gap 102 is defined by a fixed wall 105'. The fixed wall may include, for example, rollers or an endless-loop belt (not shown) to facilitate movement of the mat material 92 through the press assembly. It will be readily apparent that the lower surface could alternatively be defined by a fixed wall with upper press units provided to compress the mat material 92.

Although a currently-preferred embodiment of the present invention is disclosed to aid the artisan in understanding the present invention, the invention is not limited to the disclosed press assembly 100 and it will be immediately obvious to persons of skill in the art that many straightforward changes to the press assembly 100 may be made without departing from the present invention. In particular, it is contemplated that the lower and upper platens 113, 115 may be driven along a non-linear path of travel that is not circular. Also, of course, more or fewer press modules 110 and/or low-pressure press modules 100' may be utilized in a particular press. The press modules 110 may be engaged by alternative driving means to achieve a circular or other cyclical nonlinear motion—for example, utilizing a geared or belt-driven assembly to achieve the desired motion. Although electric motors are preferred, other driving means such as diesel or other engines may alternatively be utilized or hydraulic or pneumatic actuators may provide the motive force for the press modules 110. It is contemplated that the desired synchronization of the press modules 110 may be accomplished or enhanced using an active monitoring and control system. The press modules 110 may include vertical adjustment mechanisms whereby the width and/or profile of the channel 102 may be selectively adjusted—for example, to accommodate various mat materials and/or to produce different board thicknesses.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A press assembly comprising:
    a plurality of press modules, each press module having a first drive shaft operably connected to a first platen and an oppositely-disposed surface, wherein the first platen and the oppositely-disposed surface cooperatively define a gap therebetween;
    a drive assembly including at least one motor and a drive train connecting the at least one motor to the first drive shaft;
    wherein rotating the first drive shaft moves the first platen along a circular path of travel in a machine direction such that the gap between the first platen and the oppositely-disposed surface periodically narrows and widens during rotation of the first drive shaft; and
    wherein the first drive shaft comprises at least one concentric cylindrical section having an axis of symmetry that is coaxial with an axis of rotation of the first drive shaft and at least one eccentric cylindrical section having an axis of symmetry that is offset from the axis of rotation of the first drive shaft.

2. The press assembly of claim 1, wherein the oppositely-disposed surface comprises a second platen that is operably connected to a second drive shaft, the second drive shaft being connected to the drive train, and wherein rotating the second drive shaft moves the second platen along a substantially circular path of travel in a direction opposite the first platen substantially circular path of travel.

3. The press assembly of claim 1, wherein the first drive shaft comprises a plurality of concentric sections having an axis of symmetry that is coaxial with an axis of rotation of the first drive shaft and a plurality of eccentric cylindrical sections having an axis of symmetry that is offset from the axis of rotation of the first drive shaft.

4. The press assembly of claim 2, wherein each press module further comprises a third drive shaft that is operatively connected to the first platen and a fourth drive shaft that is operably connected to the second platen.

5. The press assembly of claim 4, wherein the drive train comprises a plurality of module gear boxes, each module gear box coordinating the rotational motion of the first, second, third, and fourth drive shafts of one of the plurality of press modules.

6. The press assembly of claim 5, further comprising a plurality of intermediate gear boxes, wherein each intermediate gear box rotationally couples two of the plurality of module gear boxes.

7. The press assembly of claim 6, wherein the plurality of module gear boxes is interconnected with the plurality of intermediate gear boxes such that the first platens are synchronized in their circular path of motion.

8. The press assembly of claim 1, wherein the plurality of press modules comprises at least ten press modules.

9. The press of claim 1, wherein the drive assembly comprises at least twenty motors.

10. The press of claim 1, wherein the plurality of press modules is aligned such that the gaps of the plurality of press modules define a converging channel.

11. A press assembly adapted to compress a resinous wood fiber mat, the press assembly comprising:

a plurality of longitudinally aligned press modules, each press module having a lower platen that is driven along a circular pat of travel in a machine direction and an oppositely-disposed upper platen that is driven along a circular path of travel, wherein the upper and lower platens are spaced apart to form a gap and the gaps formed by the plurality of platens are aligned to define a channel adapted to receive the resinous wood fiber mat for compression;

wherein the lower platens are synchronized to move along the circular path of travel at the same rate and in phase and the upper platens are synchronized to move along the circular path of travel at the same rate and in phase, and further wherein the upper platen circular path of travel is synchronized with the lower platen circular path of travel such that the lower platens reach a highest point on the lower platen circular path of travel at substantially the same time the upper platens reach a lowest point on the upper platen circular path of travel; and a first eccentric shaft assembly including an eccentric drive shaft, wherein the first eccentric shaft assembly is coupled to the lower platen such that rotating the eccentric drive shaft causes the lower platens to move along the lower platens circular path of travel and a second eccentric shaft assembly including an eccentric drive shaft, wherein the second eccentric shaft assembly is coupled to the upper platen such that rotating the eccentric drive shaft causes the upper platens to move along the upper platens circular path of travel;

a first concentric shaft assembly coupled to the lower platen:

whereby the upper and lower platens are adapted to compress the resinous wood fiber mat therebetween during a portion of the upper and lower platen circular path of travel and to release the resinous wood fiber mat during a portion of the upper and lower platen circular path of travel.

12. The press assembly of claim 11, further comprising a gear assembly interconnecting the first and second shaft assemblies of the plurality of press modules such that the upper platen and lower platen circular paths of travel are synchronized.

13. The press assembly of claim 11, further comprising a plurality of motors drivably connected to the plurality of press modules.

14. The press assembly of claim 11, wherein the upper and lower platens are heated.

15. The press assembly of claim 11, wherein movement of the upper and lower platens propels the resinous wood fiber mat through the channel.

16. A method for forming a wood panel by compressing a resinous wood fiber mat, the method comprising the steps of:

providing a press assembly having a plurality of lower platens that are driven along a first circular path of travel in a machine direction and a plurality of corresponding upper platens driven along a second circular path of travel, each upper platen disposed opposite one of the plurality of lower platens, the upper and lower platens being longitudinally aligned to define a channel therebetween;

feeding a resinous wood fiber mat into the press assembly; and driving the lower platens along the first circular path of travel and the upper platens along the second circular path of travel synchronously and with sufficient power to compress resinous wood fiber mat and to propel the resinous wood fiber mat through the channel wherein the upper and lower platens are each operably attached to an eccentric drive shaft assembly and a concentric drive shaft assembly such that rotating the eccentric drive shaft assembly and the concentric drive shaft assembly moves the platens along the circular path of travel.

17. The method of claim 16, wherein the eccentric drive shaft assemblies are interconnected with a drive train such that the motion of the upper and lower platens is synchronized.

* * * * *